US012452157B2

(12) United States Patent
Ryu et al.

(10) Patent No.: US 12,452,157 B2
(45) Date of Patent: Oct. 21, 2025

(54) SYSTEM AND METHOD FOR APPLIANCE COMMUNICATION

(71) Applicant: Haier US Appliance Solutions, Inc., Wilmington, DE (US)

(72) Inventors: Seonghoon Ryu, Suwon (KR); Jaewon Jo, Bundang (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 68 days.

(21) Appl. No.: 18/500,518

(22) Filed: Nov. 2, 2023

(65) Prior Publication Data
US 2025/0150378 A1    May 8, 2025

(51) Int. Cl.
*G06F 15/173*  (2006.01)
*H04L 43/062*  (2022.01)
*H04L 43/50*   (2022.01)
*H04W 24/10*   (2009.01)

(52) U.S. Cl.
CPC ............ *H04L 43/50* (2013.01); *H04L 43/062* (2013.01); *H04W 24/10* (2013.01)

(58) Field of Classification Search
CPC ............................. H04L 43/062; H04L 43/50
See application file for complete search history.

(56) References Cited

U.S. PATENT DOCUMENTS

| | | | |
|---|---|---|---|
| 11,490,445 B2 | 11/2022 | Moon | |
| 2004/0122996 A1* | 6/2004 | Carau, Sr. | H04L 12/2898 710/36 |
| 2007/0106898 A1* | 5/2007 | Mizutani | H04W 12/04 380/278 |
| 2019/0052476 A1 | 2/2019 | Shue et al. | |
| 2020/0228932 A1* | 7/2020 | Ernst | H04L 63/101 |

FOREIGN PATENT DOCUMENTS

CN    113625580 A    11/2021

* cited by examiner

*Primary Examiner* — Yves Dalencourt
(74) *Attorney, Agent, or Firm* — Dority & Manning, P.A.

(57) ABSTRACT

A system and method for appliance communication is provided, the system including a first and second appliance each including a short range radio communications device, an internet communications device, and a controller configured to execute operations. The operations include transmitting, from the first radio communications device to the second radio communications device, a request signal requesting a transmission from a communications network; transmitting, from the second internet communications device of the second appliance, a communications signal requesting a data packet from a communications network to which the internet communications device is communicatively coupled; transmitting, from the second internet communications device to the second radio communications device, the data packet received from the communications network; transmitting, from the second radio communications device to the first radio communications device, the data packet; and accessing, via the first controller, the data packet received via the first radio communications device.

16 Claims, 3 Drawing Sheets

SYSTEM AND METHOD FOR APPLIANCE COMMUNICATION

FIELD

The present subject matter relates generally to appliances and methods for wireless communication and fault determination.

BACKGROUND

Appliances, such as residential and commercial appliances, may include communications devices for receiving Over-the-Air (OTA) software updates. However, communications devices may experience errors or failures that disable OTA updates. Such errors or failures may further disable real-time controls system, updates, or other functions that depend on internet connectivity.

Accordingly, systems and methods for determining an operational state of an appliance is desired and would be advantageous. Additionally, or alternatively, systems and methods for appliance data transmission are desired and would be advantageous.

BRIEF DESCRIPTION

Aspects and advantages of the invention will be set forth in part in the following description, or may be obvious from the description, or may be learned through practice of the invention.

An aspect of the present disclosure is directed to a system for appliance communication, the system including a first and second appliance each including a short range radio communications device, an internet communications device, and a controller configured to execute operations. The operations include transmitting, from the first radio communications device to the second radio communications device, a request signal requesting a transmission from a communications network; transmitting, from the second internet communications device of the second appliance, a communications signal requesting a data packet from a communications network to which the internet communications device is communicatively coupled; transmitting, from the second internet communications device to the second radio communications device, the data packet received from the communications network; transmitting, from the second radio communications device to the first radio communications device, the data packet; and accessing, via the first controller, the data packet received via the first radio communications device.

Another aspect of the present disclosure is directed to a computer-implemented method for data transmission over two or more appliances. The method includes communicatively coupling together a short range radio communications device of a first appliance and a second appliance; transmitting, from the short range radio communications device of the first appliance to the short range radio communications device of the second appliance, a request signal requesting a transmission from a communications network; transmitting, from an internet communications device of the second appliance, a communications signal requesting a data packet from a communications network to which the internet communications device is communicatively coupled; transmitting, from the internet communications device of the second appliance to the short range radio communications device of the second appliance, the data packet received from the communications network; transmitting, from the short range radio communications device of the second appliance to the short range radio communications device of the first appliance, the data packet; and accessing, via the controller at the first appliance, the data packet received via the short range radio communications device.

Still another aspect of the present disclosure is directed to a system for determining an operational state of an internet communications device at one or more appliances. The system includes a first appliance and a second appliance each including a short-range radio communications device and an internet communications device coupled to the short range radio communications device at the respective appliance, the first appliance and the second appliance including a controller configured to execute instructions that cause the first appliance and the second appliance to perform operations, the operations including transmitting, from the controller of the first appliance to the internet communications device of the first appliance, a first control signal requesting a first data packet from a communications network; communicatively coupling together the short range radio communications device of the first appliance and the second appliance; transmitting, via the short range radio communications device of the first appliance to the short range radio communications device of the second appliance, a request signal for a second data packet from the communications network if the internet communications device at the first appliance fails to receive the first data packet from the communications network; transmitting, from the controller of the second appliance to the internet communications device of the second appliance, a second control signal requesting a second data packet from the communications network; generating a first user notification signal indicative of communications network error if the internet communications device at the second appliance fails to receive the second data packet from the communications network; transmitting, from the internet communications device of the second appliance to the short range radio communications device of the second appliance, the second data packet when received from the communications network; transmitting, via the short range radio communications device of the second appliance to the short range radio communications device of the first appliance, the second data packet; and generating a second user notification signal indicative of internet communications device error at the first appliance after the internet communications device at the second appliance receives the second data packet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
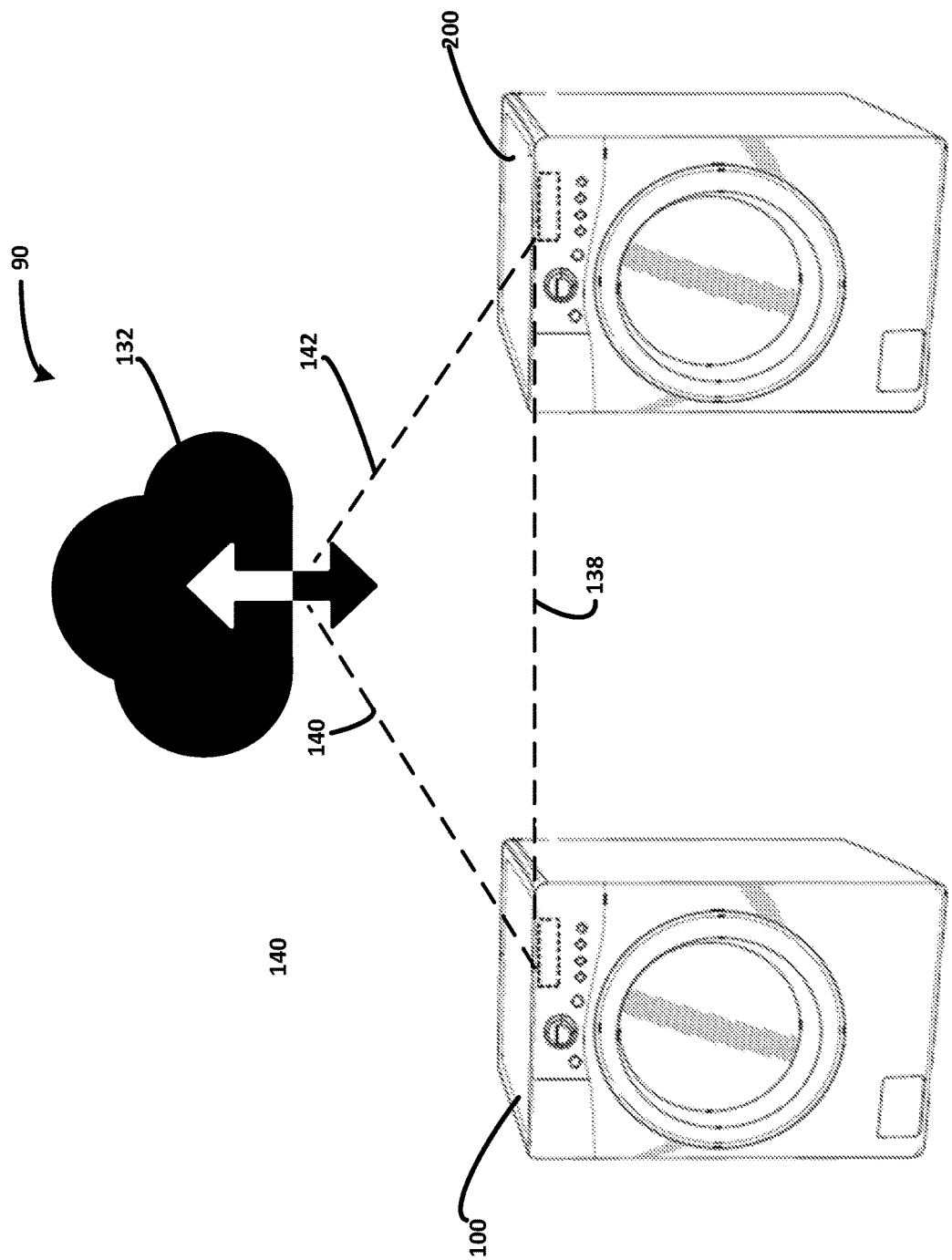
FIG. 1 provides a schematic embodiment of an interconnected system of appliances in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Referring now to the drawings, FIG. 1 depicts a schematic exemplary embodiment of an interconnected system of appliances (hereinafter, "system 90"). Embodiments of the system 90 form a system for appliance communication and a system for determining an operational state of an appliance. Embodiments of the system 90 may be configured to perform operations or steps of a method for determining an operational state of an internet communications device at one or more appliances (hereinafter, "method 1000"). Embodiments of system 90 may additionally, or alternatively, be configured to perform operations or steps of a method for data transmission over two or more appliances.

Figure 2:
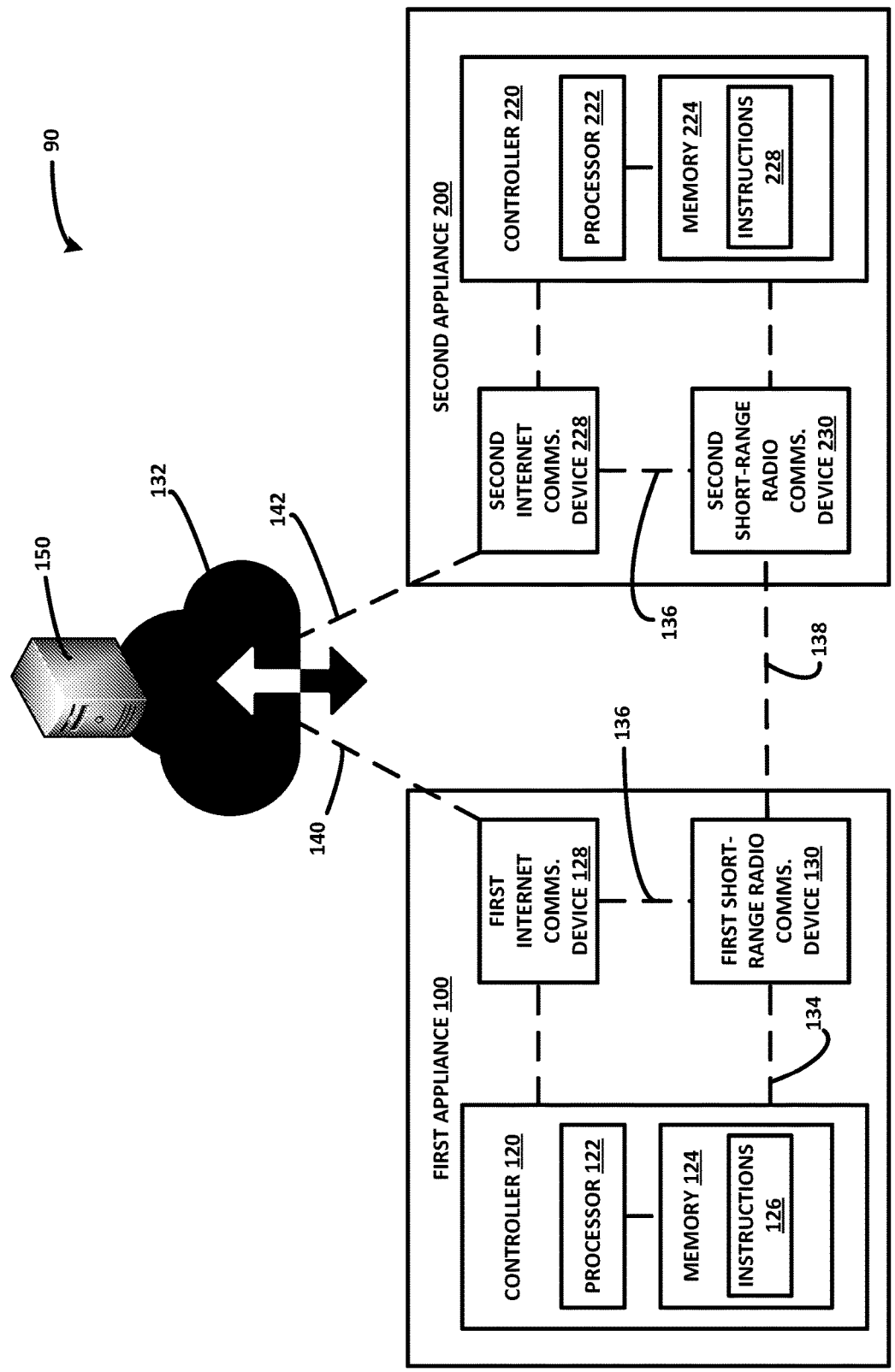
FIG. 2 provides a schematic embodiment of an interconnected system of appliances in accordance with aspects of the present disclosure.

Embodiments of the system 90 includes two or more appliances 100, 200 positioned within communicative range of one another relative to a short range radio communications device, such as depicted in FIG. 2 at short range radio communications devices 130, 230 at respective appliances 100, 200. The short range radio communications devices 130, 230 are configured to allow direct wireless communication between one another. Devices 130, 230 are configured to use a radio frequency to share data over a short distance (e.g., up to approximately 3 meters, or up to approximately 30 meters). Embodiments of the system 90 are configured to communicatively couple together the devices 130, 230 at respective appliances 100, 200. Embodiments of the devices 130, 230 may be configured in accordance with Bluetooth® wireless communications standards, such as Bluetooth® Low Energy (BLE), or other appropriate short range, low-power, wireless protocols, such as, but not limited to, Unison, Xender, Xigbee®, and the like.

Devices 130, 230 may be configured for direct wireless communication in contrast to internet communications devices 128, 228 at respective appliances 100, 200 configured to communicatively couple to a remote or cloud-based server 150 or computing network 132. Network 132 may include one or more of a local area network (LAN), a wide area network (WAN), a personal area network (PAN), the Internet, a cellular network, or any other suitable wireless network. Internet communications devices 128, 228 are configured to transmit and receive, signals, data packets, information, datasets, and the like, over the network 132 and between the appliance 100, 200 and the server 150. The server 150 may be configured to store and transmit data in a database, or providing computational processing, relating to controls, control signals, software patches or updates, or other Over-the-Air (OTA) processes as may be appropriate for appliances 100, 200. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

It should be appreciated that devices 130, 230 may form radio communications devices configured to allow for direct communication or pairing of one another (e.g., depicted schematically via line 138 in FIG. 2), such as may contrast with devices 128, 228 forming relatively long-range radio communications devices as may be configured to communicate through a wired or wireless network 132 (e.g., Internet, Intranet, LAN, WAN, PAN, etc.).

In some embodiments, appliances 100, 200 form a washer-dryer appliance pair. For example, appliances 100, 200 may form a washing machine appliance positioned adjacent to a dryer appliance. Accordingly, appliances 100, 200 may be positioned in relatively short range (e.g., within up to approximately 3 meters or 10 meters of one another).

In still some embodiments, appliances 100, 200 may form kitchen appliances positioned in relatively short range of one another, such as, but not limited to, a refrigeration appliance, a cooking appliance, a dishwashing appliance, etc.

In various embodiments, appliances 100, 200 may generally form at two appliances positioned in relatively short range of one another such as described herein, such as positioned within the same household or commercial facility as one another. Appliances 100, 200 may be configured as generally understood in the art as any household or commercial appliance such as generally provided herein.

Appliances 100, 200 each include a respective controller 120, 220 configured to regulate, allow, inhibit, articulate, or otherwise operate appliances 100, 200. Controller 120, 220 may be positioned in a variety of locations throughout appliance 100, 200 (e.g., a control panel area, at a door, etc.). In some embodiments, input/output ("I/O") signals are routed between controller 120, 220 and various operational components of appliance 100, 200 along wiring harnesses that may be routed. Controller 120, 220 may include a user interface panel through which a user may select various operational features and operating modes and monitor progress of the appliance 100, 200. The user interface may represent a general purpose I/O ("GPIO") device or functional block. Additionally, the user interface may include input components, such as one or more of a variety of electrical, mechanical, or electro-mechanical input devices including rotary dials, push buttons, and touch pads. The user interface may also include a display component, such as a digital or analog display device designed to provide operational feedback to a user. The user interface may be in communication with the controller 120, 220 via one or more signal lines or shared communication busses.

Controllers 120, 220 include one or more processing devices 122, 222 and memory devices 124, 224. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120, 220 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Memory devices 124, 224 may include non-transitory computer-readable storage mediums, such as RAM, ROM, EEPROM, EPROM, flash memory devices, magnetic disks, or other suitable memory devices (including combinations thereof). These memory devices may be a separate component from the processing device 122, 222 or may be included onboard within the processor. In addition, these memory devices 124, 224 can store information and/or data accessible by the one or more processors 122, 222, including instructions 126, 226 that can be executed by the one or more processors, such as one or more steps of method 1000. It should be appreciated that instructions 126, 226 can be software written in any suitable programming language or can be implemented in hardware. Additionally, or alternatively, instructions 126, 226 can be executed logically and/or virtually using separate threads on one or more processors 122, 222. Executed instructions 126, 226 cause the system 90, the appliances 100, 200, or server 150 to perform operations, such as one or more steps of method 1000 provided further herein.

For example, controller 120, 220 may be operable to execute programming instructions 126, 226 or micro-control code associated with an operating cycle or operating mode of appliance 100, 200, or a controls update (e.g., OTA data transmission, such as to/from server 150 over network 132). In this regard, the instructions 126, 226 may be software or any set of instructions that when executed by the processing device, cause the processing device to perform operations, such as running one or more software applications, displaying a user interface, receiving user input signals, processing user input signals, or permitting or disabling operation of the appliance 100, 200.

Moreover, it should be noted that controller 120, 220 as disclosed herein is additionally, or alternatively, configured to transmit signals, store, execute, or otherwise operate or perform any one or more methods, method steps, or portions of methods as disclosed herein. For example, in some embodiments, methods disclosed herein may be embodied in programming instructions stored in the memory device at one or more of controller 120, 220 or server 150. The memory devices may also store data that can be retrieved, manipulated, created, or stored by the one or more processors or portions of controller 120, 220.

Referring still to FIG. 2, one or more of the appliances includes the controller communicatively coupled to an internet communications device (e.g., device 128, 228) and a short range radio communications device (e.g., device 130, 230). In some embodiments, the short range communications device is coupled in parallel to the controller relative to the internet communications device. For instance, the short range communications device is coupled to the controller such as to allow for communication between the controller and the short range communications device without requiring operation or operability of the internet communications device at the appliance.

In various embodiments, such as schematically depicted in FIG. 2, the appliance includes a communications bus 134 between the controller and short range radio communications device (e.g., between controller 120 and device 128, between controller 220 and device 228), such as a direct communications bus. In still various embodiments, the appliance includes a communications bus 136 between the internet communications device and the short range radio communications device (e.g., between device 128 and 130, between device 228 and 230), such as a direct communications bus. In some embodiments, the internet communications device may be configured to direct communicative coupling with the controller (e.g., device 128 to controller 120, device 228 to controller 220).

Figure 3:
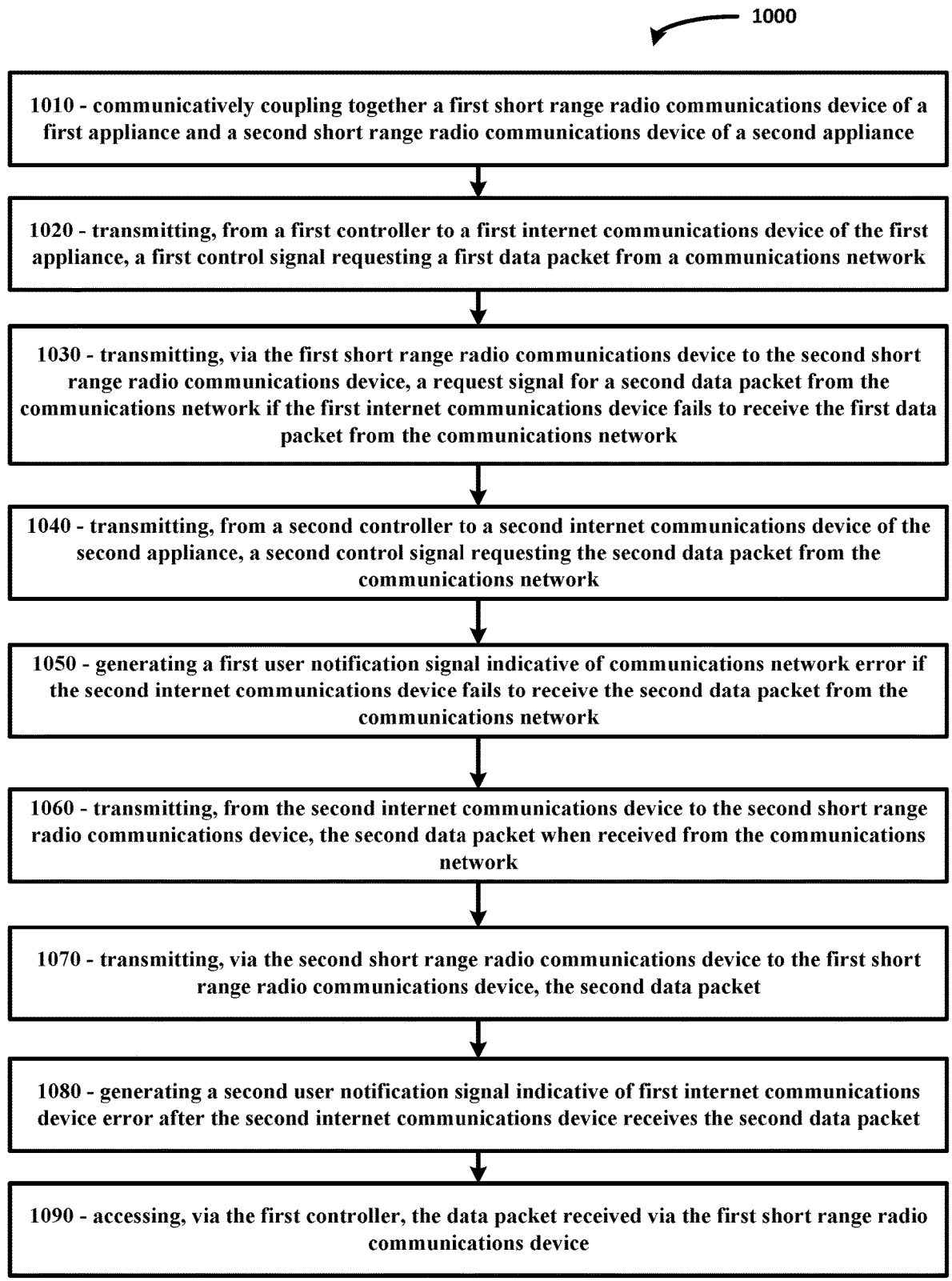
FIG. 3 provides a flowchart outlining steps of a method for determining an operational state of an internet communications device at one or more appliances in accordance with aspects of the present disclosure.

Referring now to FIG. 3, a flowchart outlining exemplary steps of the method 1000 are provided. It should be appreciated that steps provided herein may be rearranged, iterated, performed in series or parallel, or omitted. As provided above, embodiments of the method 1000, or portions thereof, may form steps or instructions executable via a controller (e.g., controller 120, 220), that, when executed, causes an interconnected system of appliances (e.g., appliances 100, 200), to perform operations.

Method 1000 includes at 1010 communicatively coupling together the short range radio communications device of the first appliance (e.g., device 130 at appliance 100) and the short range radio communications device of the second appliance (e.g., device 230 at appliance 200), such as described herein, and depicted at FIG. 2 via wireless communications link 138.

Method 1000 includes at 1020 transmitting, from the controller of the first appliance (e.g., controller 120 at first appliance 100) to the internet communications device (e.g., first internet communications device 128) of the first appliance, a first control signal requesting a first data packet from a communications network (e.g., network 132). In some embodiments, method 1000 at 1020 includes transmitting a request for the first data packet via the internet communications device for a period of time. The period of time may correspond to a period after which the request is timed-out. It should be appreciated that the period of time may include any desired or suitable period of time for requesting data transmission, such as may correspond to elapsed time, quantity of attempts over a period of time, etc.

Method 1000 includes at 1030 transmitting, via the short range radio communications device of the first appliance (e.g., device 130 at appliance 100) to the short range radio communications device of the second appliance (e.g., device 230 at appliance 200), a request signal for a second data packet from the communications network (e.g., network 132) if the internet communications device at the first appliance (e.g., device 128) fails to receive the first data packet from the communications network (e.g., via link 140 depicted in FIG. 2). In some embodiments, method 1000 at 1030 includes transmitting the request for the second data packet after the request for the first data packet at 1010 timed-out.

Method 1000 includes at 1040 transmitting, from the controller of the second appliance (e.g., controller 220) to the internet communications device of the second appliance (e.g., internet communications device 228), a second control signal requesting the second data packet from the communications network. In some embodiments, method 1000 at 1040 includes transmitting a request for the second data packet via the internet communications device for a period of time, such as described in regard to method 1000 at 1020.

In various embodiments, method 1000 includes at 1050 generating a first user notification signal (e.g., via controller 220) indicative of communications network error (e.g., error at network 132, such as a router, infrastructure connectivity, internet access, error at server 150, etc.) if the internet communications device at the second appliance (e.g., device 228) fails to receive the second data packet from the communications network (e.g., via link 142 in FIG. 2). In some embodiments, method 1000 at 1050 includes generating the first user notification signal after the request for the second data packet at 1040 timed-out.

Method 1000 includes at 1060 transmitting, from the internet communications device of the second appliance (e.g., device 228) to the short range radio communications device of the second appliance (e.g., device 230), the second data packet when received from the communications network (e.g., via link 142 and bus 136).

Method 1000 includes at 1070 transmitting, via the short range radio communications device of the second appliance (e.g., device 230) to the short range radio communications device of the first appliance (e.g., device 130), the second data packet (e.g., via link 138).

In some embodiments, method 1000 includes at 1080 generating a second user notification signal indicative of internet communications device error at the first appliance (e.g., device 128) after the internet communications device at the second appliance (e.g., device 228) receives the second data packet, such as resulting from transmission of the request in step 1040. For instance, step 1080 may form a step for determining an operational state of the internet communications device at the first appliance.

In various embodiments, method 1000 may include at 1090 accessing, via the controller at the first appliance (e.g., controller 120), the data packet received via the short range radio communications device (e.g., device 130). Accessing the data packet may include performing a control command, a software update, a control parameter change, or other change or operational step of the appliance.

In still some embodiments method 1000 may provide steps for a method for performing a network transmission test. The network transmission test may include transmitting a communications signal requesting a test data packet over a network and generating a user notification signal indicative of internet communications device at the second appliance not connected to the communications network if transmission of the communications signal requesting the data packet fails.

In various embodiments, method 1000 may provide a method for determining operability of an internet communications device. For instance, method 1000 at 1050 may determine that the network, server, or components thereof (e.g., a router, database, connectivity, infrastructure, etc.) is causing the network (e.g., network 132) or server (e.g., server 150) to not function. In another instance, method 1000 at 1080 may determine that the internet communications device at the first appliance is non-functioning, dysfunctional, disconnected, or otherwise inoperable. One or more additional methods at the controller may be performed to the internet communications device to determine error codes, failure modes, energy state, other functional state. One or both of steps 1050, 1080 may form steps of a method for determining an operational state of an internet communications device at one or more interconnected appliances.

In still various embodiments, method 1000 may provide a method for determining operability of an internet communications device. For instance, methods 1000 at 1050 may determine that the internet communications device at the first appliance is non-functioning, dysfunctional, disconnected, or otherwise inoperable. One or more additional methods at the controller may be performed to the internet communications device to determine error codes, failure modes, energy state, other functional state.

In various embodiments, one or more steps of method 1000 may include transmitting, via a short range communication mesh (e.g., a Bluetooth mesh) to a plurality of second appliances within approximately 10 meters of one another, or within 100 meters of the first appliance, the request signal requesting transmission of the second data packet from the communications network (e.g., network 132) if the internet communications device at the first appliance (device 128) fails to receive the first data packet from the communications network (e.g., failure via link 140). In some embodiments, generating the first user notification signal at 1050 includes generating the first user notification signal indicative of communications network error if the internet communications device at the plurality of second appliances (e.g., device 228 at plurality of appliances 200) fails to receive the second data packet from the communications network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for appliance communication, the system comprising:
a first appliance and a second appliance each comprising a short range radio communications device, and wherein the second appliance comprises an internet communications device communicatively coupled to the short range radio communications device at the second appliance, the first appliance and the second appliance comprising a controller configured to execute instructions that cause the first appliance and the second appliance to perform operations, the operations comprising:
determining an operational state of an internet communications device at the first appliance;
communicatively coupling together the short range radio communications device of the first appliance and the second appliance;
transmitting, from the short range radio communications device of the first appliance to the short range radio communications device of the second appliance, a request signal requesting a transmission from a communications network wherein the operational state of the internet communications device of the first appliance is determined as inoperable; then
transmitting, from the internet communications device of the second appliance, a communications signal requesting a data packet from a communications network to which the internet communications device of the second appliance is communicatively coupled; then
transmitting, from the internet communications device of the second appliance to the short range radio communications device of the second appliance, the data packet received from the communications network; then
transmitting, from the short range radio communications device of the second appliance to the short range radio communications device of the first appliance, the data packet; and
accessing, via the controller at the first appliance, the data packet received via the short range radio communications device.

2. The system of claim 1, the operations comprising:
performing a network transmission test, the network transmission test comprising transmitting a communications signal requesting a test data packet over a network; and
generating a user notification signal indicative of internet communications device at the second appliance not connected to the communications network if transmission of the communications signal requesting the data packet fails.

3. The system of claim 1, wherein the first appliance is positioned within approximately 100 meters of the second appliance.

4. The system of claim 1, wherein the short range radio communications device is a Bluetooth Low-Energy communications device.

5. The system of claim 1, wherein determining the operational state of the internet communications device at the second appliance comprises generating a user notification signal indicative of internet communications network error if transmission of the communications signal requesting the data packet fails and the operational state of the internet communications device of the first appliance is determined as inoperable.

6. The system of claim 1, the operations comprising:
transmitting, via a short range radio communications mesh to a plurality of second appliances within approximately 10 meters of the first appliance, the request signal requesting a second data packet from the communications network if the internet communications device at the first appliance fails to receive the first data packet from the communications network.

7. The system of claim 6, wherein generating the first user notification signal comprises generating a first user notification signal indicative of communications network error if the internet communications device at the plurality of second appliances fails to receive the second data packet from the communications network.

8. A computer-implemented method for data transmission over two or more appliances, the method comprising:
determining an operational state of an internet communications device at the first appliance;
communicatively coupling together a short range radio communications device of a first appliance and a second appliance;
transmitting, from the short range radio communications device of the first appliance to the short range radio communications device of the second appliance, a request signal requesting a transmission from a communications network wherein the operational state of the internet communications device of the first appliance is determined as inoperable; then
transmitting, from an internet communications device of the second appliance, a communications signal requesting a data packet from a communications network to which the internet communications device of the second appliance is communicatively coupled;
transmitting, from the internet communications device of the second appliance to the short range radio communications device of the second appliance, the data packet received from the communications network; then
transmitting, from the short range radio communications device of the second appliance to the short range radio communications device of the first appliance, the data packet; and
accessing, via the controller at the first appliance, the data packet received via the short range radio communications device.

9. The computer-implemented method of claim 8, the method comprising:
performing a network transmission test, the network transmission test comprising transmitting a communications signal requesting a test data packet over a network; and
generating a user notification signal indicative of internet communications device at the second appliance not connected to the communications network if transmission of the communications signal requesting the data packet fails.

10. The computer-implemented method of claim 8, wherein determining the operational state of the internet communications device at the second appliance comprises generating a user notification signal indicative of internet communications network error if transmission of the communications signal requesting the data packet fails and the operational state of the internet communications device of the first appliance is determined as inoperable.

11. A system for determining an operational state of an internet communications device at one or more appliances, the system comprising:

a first appliance and a second appliance each comprising a short-range radio communications device and an internet communications device coupled to the short range radio communications device at the respective appliance, the first appliance and the second appliance comprising a controller configured to execute instructions that cause the first appliance and the second appliance to perform operations, the operations comprising:

transmitting, from the controller of the first appliance to the internet communications device of the first appliance, a first control signal requesting a first data packet from a communications network;

communicatively coupling together the short range radio communications device of the first appliance and the second appliance;

transmitting, via the short range radio communications device of the first appliance to the short range radio communications device of the second appliance, a request signal for a second data packet from the communications network if the internet communications device at the first appliance fails to receive the first data packet from the communications network;

transmitting, from the controller of the second appliance to the internet communications device of the second appliance, a second control signal requesting a second data packet from the communications network;

generating a first user notification signal indicative of communications network error if the internet communications device at the second appliance fails to receive the second data packet from the communications network;

transmitting, from the internet communications device of the second appliance to the short range radio communications device of the second appliance, the second data packet when received from the communications network;

transmitting, via the short range radio communications device of the second appliance to the short range radio communications device of the first appliance, the second data packet; and generating a second user notification signal indicative of internet communications device error at the first appliance after the internet communications device at the second appliance receives the second data packet.

12. The system of claim 11, wherein the first appliance is positioned within approximately 10 meters of the second appliance.

13. The system of claim 11, wherein the short range radio communications device is a Bluetooth Low-Energy communications device.

14. The system of claim 11, wherein the first appliance and the second appliance is a washing machine appliance, a dryer appliance, or both.

15. The system of claim 11, the operations comprising:

transmitting, via a short range radio communications mesh to a plurality of second appliances within approximately 100 meters of the first appliance, a request signal requesting the second data packet from the communications network if the internet communications device at the first appliance fails to receive the first data packet from the communications network.

16. The system of claim 15, wherein generating the first user notification signal comprises generating the first user notification signal indicative of communications network error if the internet communications device at the plurality of second appliances fails to receive the second data packet from the communications network.

* * * * *